H. G. SCHAEFER.
LOADING DEVICE.
APPLICATION FILED JUNE 12, 1919.

1,339,290.

Patented May 4, 1920.
3 SHEETS—SHEET 3.

Inventor,
H. G. Schaefer
By John A. Bommhardt
Atty.

UNITED STATES PATENT OFFICE.

HENRY G. SCHAEFER, OF CLEVELAND, OHIO.

LOADING DEVICE.

1,339,290. Specification of Letters Patent. Patented May 4, 1920.

Application filed June 12, 1919. Serial No. 303,531.

*To all whom it may concern:*

Be it known that I, HENRY G. SCHAEFER, a citizen of the United States, residing at Cleveland, in the county of Cuyahoga and State of Ohio, have invented certain new and useful Improvements in Loading Devices, of which the following is a specification.

This invention relates to improved loading mechanism and is particularly designed for use in connection with power-driven vehicles, such as automobile trucks.

The primary object of the device is the provision of means for loading heavy logs and similar articles upon the bed of the truck. Another object of the invention is in the provision of means which may be cheaply and conveniently applied to an ordinary truck, the features and design being such that but slight changes are required in the application of the same.

A further object of the device lies in the provision of means whereby the above may be accomplished in a simple and efficient manner and with nominal expense, the means being such as to result in a material saving of labor.

A still further object lies in the provision of means whereby logs or the like may be dragged to a convenient position for loading into the bed of the truck, and this improvement will be readily appreciated when it is found impossible to drive the truck into loading position owing to the proximity of swamps and the like found in logging camps.

Still further objects of the invention are in the provision of means which will enable the operator to load the truck from either side, means for guiding the cable upwardly and over the load, means for positively spreading the cable upon the winding drum, means for automatically releasing the power where the cable has been taken in a predetermined amount, thereby preventing damage to the operating parts, and means for applying the brake to the winding drum.

Figure 1:
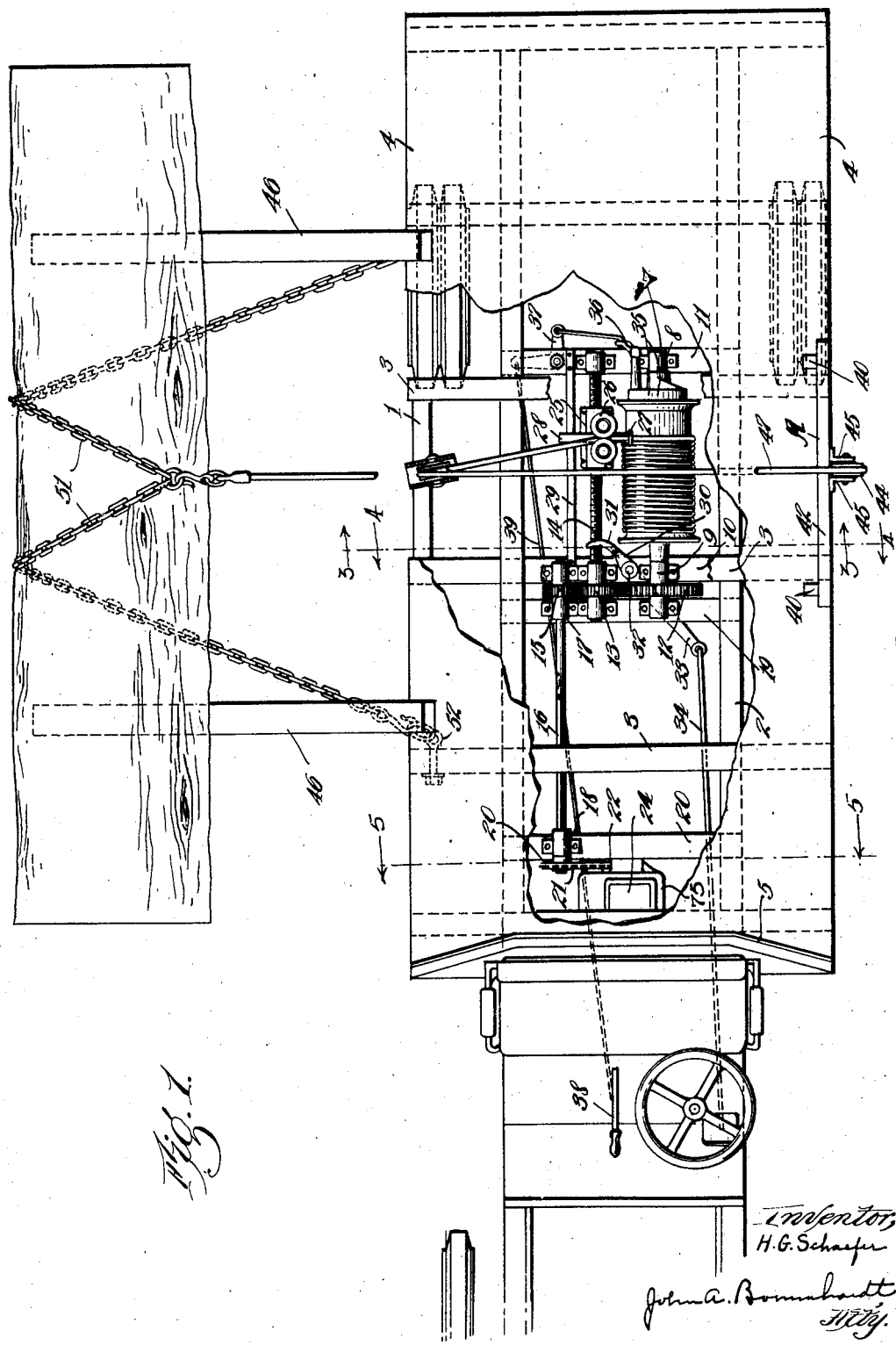
Figure 2:
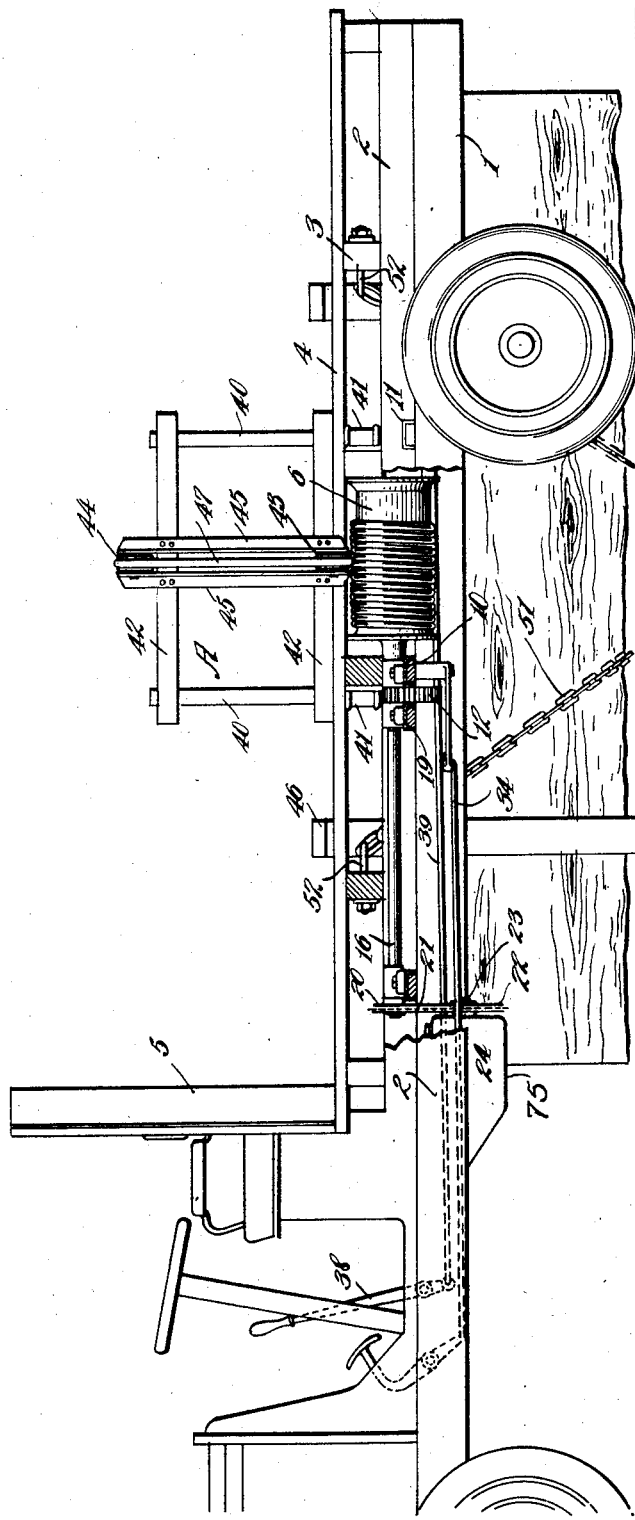
Figure 3:
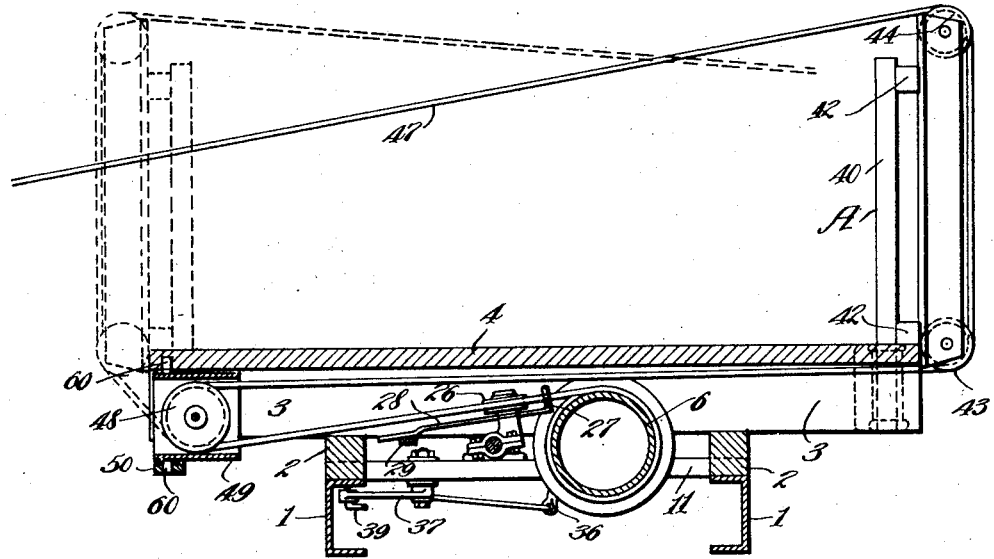
Figure 4:
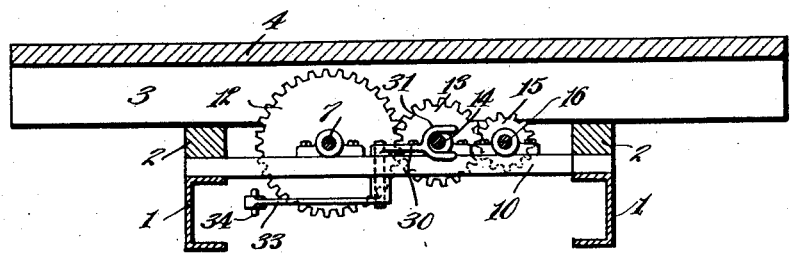
Figure 5:
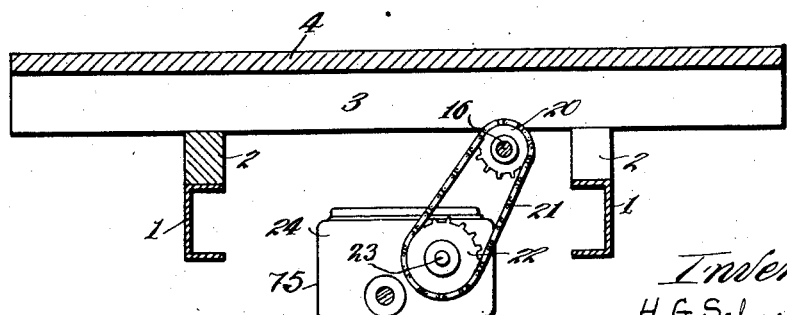

Further and more limited constructions and combinations of parts will become apparent in the annexed specifications and drawings, in which like reference numerals designate like parts throughout the various views, Figure 1 is a plan view of a truck with my invention embodied therein, certain parts being broken away for convenience of illustration; Fig. 2 is a side elevation, certain parts being broken away; Fig. 3 is a transverse section on the line 3—3 of Fig. 1; Fig. 4 is a similar section on the line 4—4 of Fig. 1, and Fig. 5 is a corresponding section on the line 5—5 of Fig. 1.

The device comprises the usual truck chassis 1 which is of channel construction and upon the top of which are secured wooden sills 2 in turn supporting a plurality of transverse bolsters 3, the bed 4 of the truck being supported upon the top of the bolsters 3. At the forward end of the bed and just to the rear of the driver's seat is a vertical protecting wall 5 of heavy sheet metal, the sides of said protecting wall adjacent to the sides of the bed acting as a deflector for the log when the same is being loaded upon the bed, it is evident that the provision of this wall is a safeguard to the driver when loading.

A drum 6 is mounted upon a shaft 7 supported within bearings 8 and 9 fixed to inverted channel members 10 and 11, the same being supported on the truck chassis 1. The drum is driven through a spur gear 12 mounted upon the shaft 7 and which meshes with an intermediate gear 13 mounted upon a shaft 14 likewise supported in bearings upon the cross members 10 and 11. This gear receives power from a pinion 15 secured to the end of a third shaft 16 supported within bearings 17 and 18 fixed to cross members 19 and 20 similar to the members 10 and 11 likewise supported by the truck chassis 1. On the end of the shaft 16 remote from the pinion 15 a sprocket wheel 20 is driven through a chain 21 and a sprocket 22 applied to the end of the power take-off shaft 23 of the transmission 24 of the truck. The transmission and the power take-off is inclosed in a housing 75 which contains suitable trains of speed gearing and the necessary clutches for controlling them independently, and which have driving connection with the crank shaft of the motor. This may vary in the different types of trucks employed and for this reason the design of the same is indicated only conventionally in the drawings as the particular construction has no specific relation to the invention. The transmission and its power take-off may vary in the different types of trucks employed and for this reason the design of the same is indicated only conventionally in the drawings, as the particular construction has no specific relation to the invention.

A nut 25 is threaded upon the aforementioned shaft 14 and supports a pair of guide pulleys 26 which are adapted to regulate and feed the cable upon the drum 6, their travel being coincident with the width of each strand of cable and controlled by the pitch of the thread on the shaft upon which the nut travels. An eye 27 projecting in a vertical direction from a substantially horizontal extension 28 carried by the nut 25 and between the aforementioned pulleys is held in a positive position by the portion 28 riding upon the upper surface of a guide 29 supported by the cross members 10 and 11. This prevents snarling when it is desired to unwind the cable manually from the drum preparatory to loading. Thus it has been found that if the drum rotates or spins at a speed greater than that employed by the worker in taking care of the cable, it sometimes causes the cable to snarl at the point between the drum and the guide pulleys 26 but by the provision of the means above described for supporting any slack which may occur at this point, this snarling is prevented.

A lever 30 having a forked end 31 which straddles the aforementioned shaft 14 is fixed to a vertical shaft 32 rotatably secured and projecting through the cross member 10, and securely fixed to the lower end of said shaft and diametrically opposite the forked lever 30 is a second lever 33 which has pivotally connected thereto a rod 34 having connection with the underneath portion of the clutch pedal forming part of the transmission of the truck.

Secured to the end of the drum 6 and adjacent to the cross member 11 is a friction brake 35 with ordinary operating mechanism embodied therein and which may be operated through a depending link 36 operatively connected to a bell crank 37 pivoted upon a stud fixed to the underside of the cross member 11, said bell crank being operated through a lever 38 placed within convenient reach of the driver and having connection therewith by a rod or cable 39.

The bed of the vehicle is provided with a plurality of stake holes near each of its sides whereby a frame indicated generally at A is supported, said frame consists of two vertical uprights 40 secured to the bed by having their lower ends placed in sockets 41 secured beneath the bed and to the bolsters 3, and transverse members 42 secured to the uprights support a pair of angle irons 45 between which are journaled a pair of sheaves 43 and 44. A cable 47 upon the drum 6 is threaded through the aforementioned eye 27, between the guide pulleys 26 and under and over a pulley 48 mounted within a carrier 49, said carrier being pivotally supported beneath the bed 4 on two pintles 60 projecting vertically therefrom, the upper one having bearing in the bed 4 and the lower one in a transverse bearing 50 secured to the bolsters 3. It will be observed from Fig. 3 that by means of the above described means the cable is led from the drum in a straight path through the eye 27, guide pulleys 26 to the underside of the pulley 48, and this prevents the cable from passing through the guide pulleys at an angle which would cause burning of the pulleys. From the pulley 48 the cable passes back and over the drum 6 to the sheave 43 up and over the sheave 44 is secured at its upper end to a log chain 51. This log chain forms substantially a V having its separate arms fixed to eye bolts 52 in the bolsters 3 and its apex provided with a ring to which the end of the cable is secured.

When it is desired to load, the truck is driven longitudinally beside the log, a pair of skids 46 are placed with one end beneath the log and the other end upon the side of the truck bed as shown, the chain is freed from the end of the cable and its apex is brought under and over the log, and after the cable has been attached to the ring aforementioned, power is applied thereto by winding the cable upon the drum, and it will be seen that as the length of the cable decreases it will carry with it the log until such time as the power is withdrawn.

To prevent the driver from carelessly leaving the power in gear after a pre-determined point for winding the cable has been reached, the nut 25 on reaching the end of the threaded shaft 14 comes in contact with the forked end 31 of the lever 30, and further movement of the nut operates in a direction to release the clutch pedal thereby throwing out the power connection to the engine. It is found necessary at times to hold the load midway upon its travel on the skids 46 and this may be very easily accomplished by the driver pulling up and locking the lever 38, which through its connection with the operating mechanism of the brake 35 tends to hold the load wherever desired.

When it is found necessary to move the frame A from the position shown in full lines in Fig. 3 to the opposite side of the bed as shown in dotted lines the cable 47 is rethreaded from the pulley 48 upwardly and over the sheaves 43 and 44 as shown in dotted lines.

While I have shown this specific form of device in the illustrations it is evident that the same is capable of various modifications and I do not wish to limit myself in the construction of the same further than is

I claim:

1. A loading mechanism for trucks, comprising a drum supported under the bed of the truck, an upright frame attachable to either side of the truck, said frame having guide pulleys thereon, a cable connected to the drum and extending crosswise under the bed of the truck in either direction and upwardly around said guide pulleys and across above the bed to the opposite side thereof, and means to operate the drum.

2. A loading mechanism for motor trucks comprising a winding drum under the bed of the truck, means independent of the truck drive to operate the drum from the motor, an upright frame adapted to be mounted at either side of the bed and having top and bottom guide pulleys over which the cable runs, said cable extending from the top pulley across above the bed of the truck, to the opposite side thereof.

3. The combination with a truck, of a winding drum located under the bed of the truck, a cable connected to the drum, a swiveling guide pulley mounted under the bed of the truck at one side thereof, and an upright frame which may be mounted at either side of the bed, said frame having upper and lower guide pulleys, and said cable extending over all of said guide pulleys.

In testimony whereof, I do affix my signature in presence of two witnesses.

HENRY G. SCHAEFER.

Witnesses:
 HUGH C. SEELEY,
 ROBERT L. BRUCK.